US008469825B2

(12) United States Patent
Banfi et al.

(10) Patent No.: US 8,469,825 B2
(45) Date of Patent: Jun. 25, 2013

(54) ELASTIC COUPLING (76) Inventors: Giuseppe Banfi, Gorla Maggiore (IT); Andrea Massari, Legnano (IT); Franco Massari, Legnano (IT)

( * ) Notice: Subject to any disclaimer, the term of this patent is extended or adjusted under 35 U.S.C. 154(b) by 60 days.

(21) Appl. No.: 13/147,506

(22) PCT Filed: Feb. 11, 2010

(86) PCT No.: PCT/EP2010/000844
§ 371 (c)(1),
(2), (4) Date: Aug. 2, 2011

(87) PCT Pub. No.: WO2010/091861
PCT Pub. Date: Aug. 19, 2010

(65) Prior Publication Data
US 2011/0312426 A1    Dec. 22, 2011

(30) Foreign Application Priority Data
Feb. 12, 2009   (IT) .............................. MI2009A0183

(51) Int. Cl.
*F16F 15/121*        (2006.01)
(52) U.S. Cl.
USPC ........................... 464/7; 464/66.1; 464/68.92
(58) Field of Classification Search
USPC .................. 464/66.1, 67.1, 68.9–68.92, 84, 7
See application file for complete search history.

(56) References Cited

U.S. PATENT DOCUMENTS

| | | | | |
|---|---|---|---|---|
| 2,984,091 A | * | 5/1961 | Ludwig | 464/68.92 |
| 4,093,054 A | * | 6/1978 | Johns | 464/84 X |
| 4,171,627 A | * | 10/1979 | Fukuda | 464/67.1 |

FOREIGN PATENT DOCUMENTS

| | | | |
|---|---|---|---|
| BE | 526221 A | 10/1954 | |
| DE | 1921972 A1 | 11/1970 | |
| GB | 102926 A | 8/1917 | |
| GB | 110683 A | 11/1917 | |
| GB | 192834 A | 2/1923 | |
| JP | 57-163730 A | * 10/1982 | 464/68.9 |

* cited by examiner

*Primary Examiner* — Gregory Binda
(74) *Attorney, Agent, or Firm* — R. Neil Sudol; Coleman Sudol Sapone, P.C.

(57) ABSTRACT

An Elastic Coupling (1) has a pair of bodies (2,3) that can rotate about a common axis and are mutually associated by a plurality of springs (7). Each spring has an end associated with the other body; the ends of the springs are associated with the bodies by floating engagement means (8). The floating engagement means are provided by mating spherical surfaces between the spring and the seats (6) and allows to recover the misalignment cased by the variation of the distance between the seats, limiting the stresses and allowing the spring to work exclusively in an axial direction, without warping, contrary to conventional spring couplings, wherein the springs are inserted in simple cylindrical seats and must necessarily warp.

17 Claims, 8 Drawing Sheets

ELASTIC COUPLING

BACKGROUND OF THE INVENTION

The present invention relates to an elastic coupling.

As is known, elastic couplings are designed so as to have good torsional deformability, in order to be able to act as shock absorbers in the transmission of motion between two shafts and reduce the critical torsional speeds of the transmission.

In an elastic coupling with helical springs, the deformability of the connection is ensured by helical springs which are interposed between protrusions formed in the disks that are keyed on the respective shafts to be connected.

In a conventional coupling, the ends of the springs rest in respective cylindrical seats or recesses provided with a substantially flat bottom.

When the coupling is deformed, the springs are compressed and the spring becomes misaligned with respect to the axis of the two seats in which it is inserted. That misalignment make the spring warp, and causes friction between the ends of the spring and the contact surfaces of the respective seats, causing fatigue of the members and overheating.

BE-526221 discloses an elastic coupling wherein each spring member is hinged to one disk and associated with the other disk with a limited play.

GB-110683 discloses a yielding shaft coupling comprising two discs provided with lugs; spring members are fastened to the lugs by bolts passing through the springs and lugs.

GB-102926 discloses an elastic thrust-transmitting device for locomotives having springs provided with socketed carriers which engage over ball-ended members; during operation, the springs are alternatively compressed and extended.

GB-192834 discloses a spring driving wheel provided with spring members mounted in spherical bearings that allow a limited play; the springs are compressed or extended depending on the direction of rotation.

OBJECTS OF THE INVENTION

The aim of the present invention is to provide an elastic coupling with helical springs that overcomes the drawbacks of the cited prior art, reducing the fatigue of the mechanical members and the generated heat.

An object of the invention is to provide an elastic coupling with helical springs which, by virtue of its particular constructive characteristics, is capable of giving the greatest assurances of reliability and safety in use.

Another object of the present invention is to provide an elastic coupling with helical springs that can be manufactured by using commonly commercially available elements and materials and is also competitive from an economic standpoint,

SUMMARY OF THE INVENTION

This aim and these and other objects, which will become better apparent hereinafter, are achieved by an elastic coupling comprising a first body and a second body, said first body and said second body being able to rotate about a common axis, said first body being associated with said second body by means of a plurality of springs, each of said springs having a first end associated with said first body and a second end associated with said second body, characterized in that said ends are associated with said respective bodies by floating engagement means.

The oscillating engagement means, provided by mating spherical surfaces between the spring and the seats, allows to recover the misalignment caused by the variation in the distance between the seats, limiting the stresses and allowing the spring to work only in an axial direction, without flexing, differently from traditional spring-loaded couplings, in which the springs, inserted in simple cylindrical seats, necessarily have to flex.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein.

DETAILED DESCRIPTION

With reference to the cited figures, the coupling according to the invention, generally designated by the reference numeral 1, comprises two bodies: a first body 2 and a second body 3.

The bodies 2 and 3 can be identical.

Each body 2, 3 comprises a main portion 4 provided with a plurality of axial protrusions 5.

Each axial protrusion 5 has at least one transverse seat 6, which is suitable to accommodate the end of a helical spring 7.

According to the present invention, each spring end is provided with a spherical spring supporting base 8.

The spherical spring supporting base 8 has an engagement surface constituted by a spherical dome 9, which rests against the bottom surface of the transverse seat 6, which is correspondingly spherical.

The spring supporting base 8 has a cavity 10, which is constituted by a dead hole that is open in the spherical dome 9 and is suitable to accommodate lubricant, which is inserted therein during the assembly of the coupling.

Figure 6:
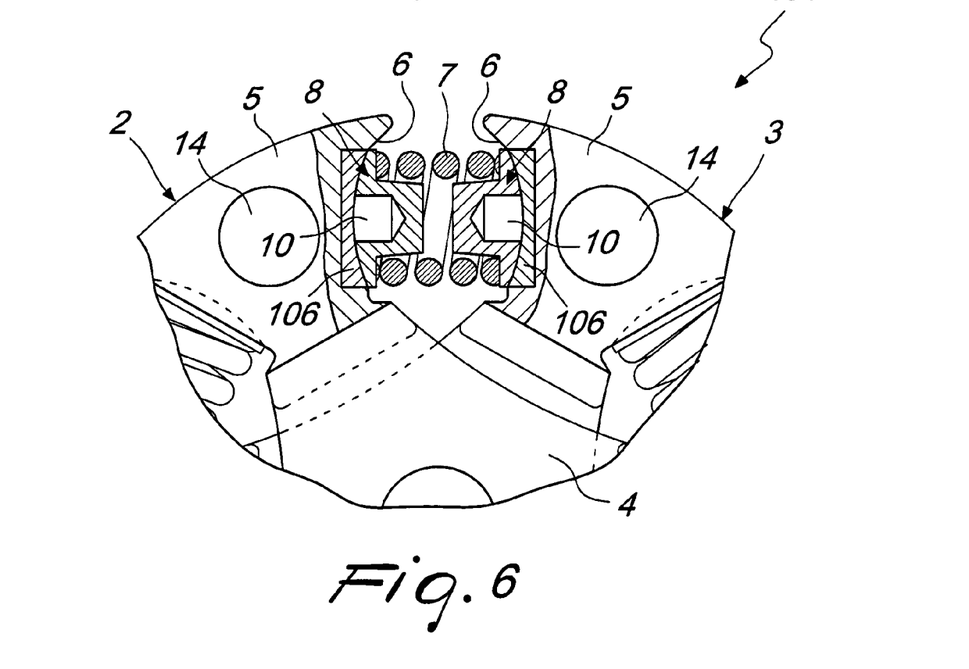
FIG. 6 is a partially sectional front view showing the seats of a spring of an elastic coupling with helical springs with an aluminum body, according to the present invention.

When the body 2, 3 is made of a relatively soft material, for example aluminum alloy, each transverse seat 6 comprises a concave disk 106, which is embedded in the aluminum alloy body but is made of a harder material in order to limit its wear caused by friction against the spring supporting base 8.

Figure 4:
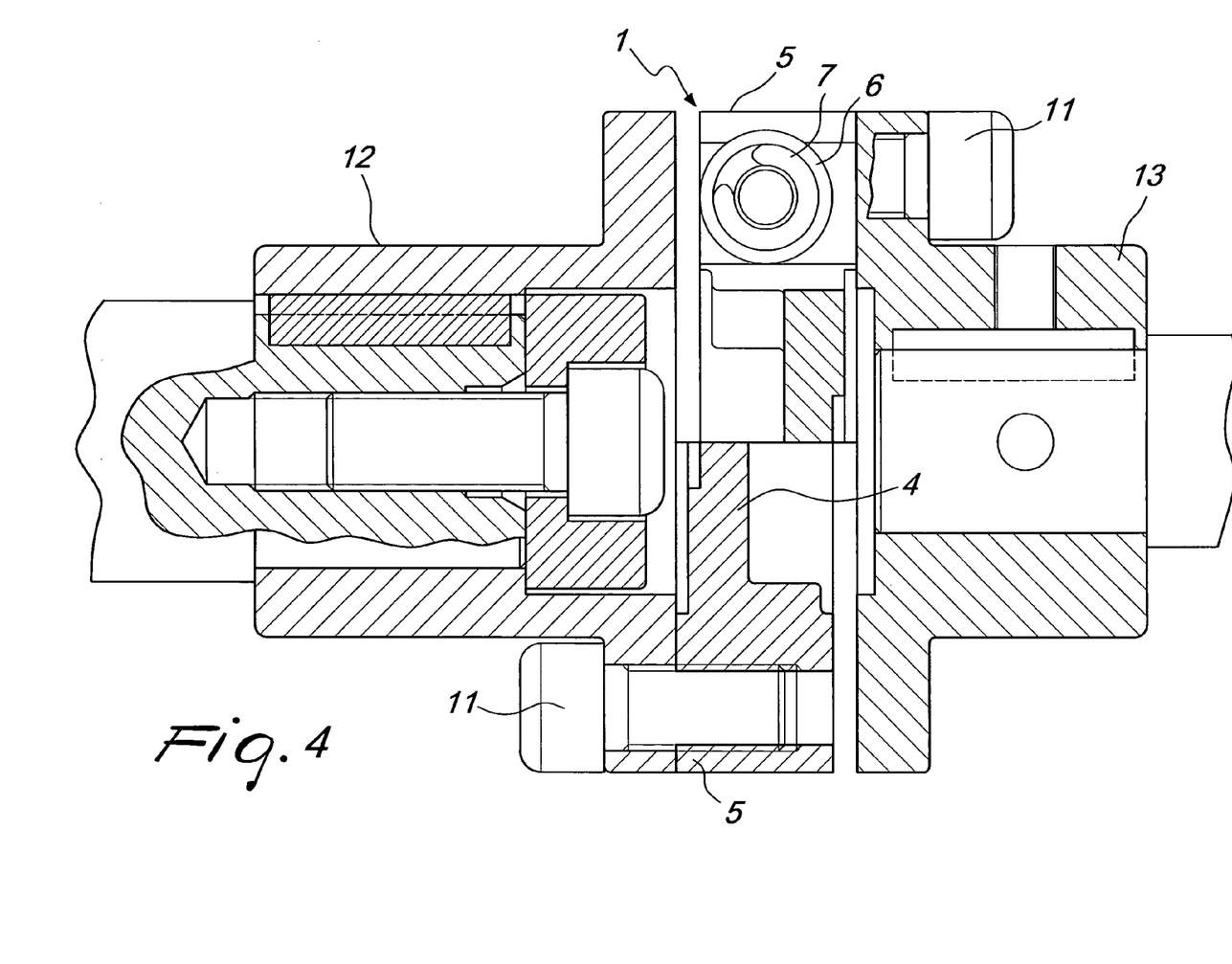
FIG. 4 is a side view schematically showing the use of a helical spring coupling, according to the present invention, for the connection of two shafts.
Figure 5:
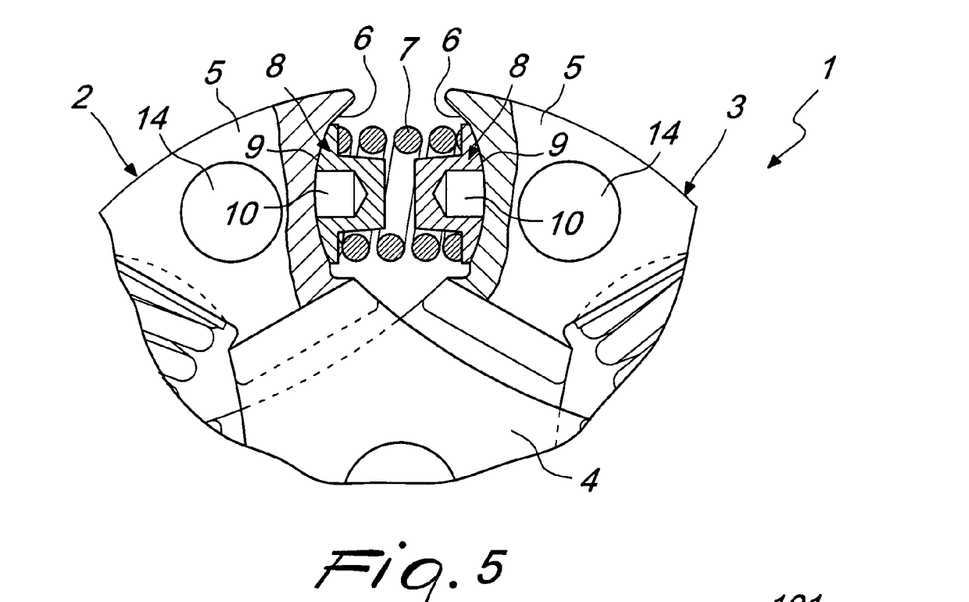
FIG. 5 is a partially sectional front view showing the seats of a spring of an elastic coupling with helical springs with a cast iron body, according to the present invention.

The bodies 2 and 3 of the coupling can be associated with respective transmission members, which are constituted for example by transmission shafts 12 and 13 respectively, as shown by way of example in FIG. 4.

The shafts can be associated with the bodies 2 and 3 by means of screws 11, which engage threaded axial seats 14 formed in the protrusions 5.

Figure 1:
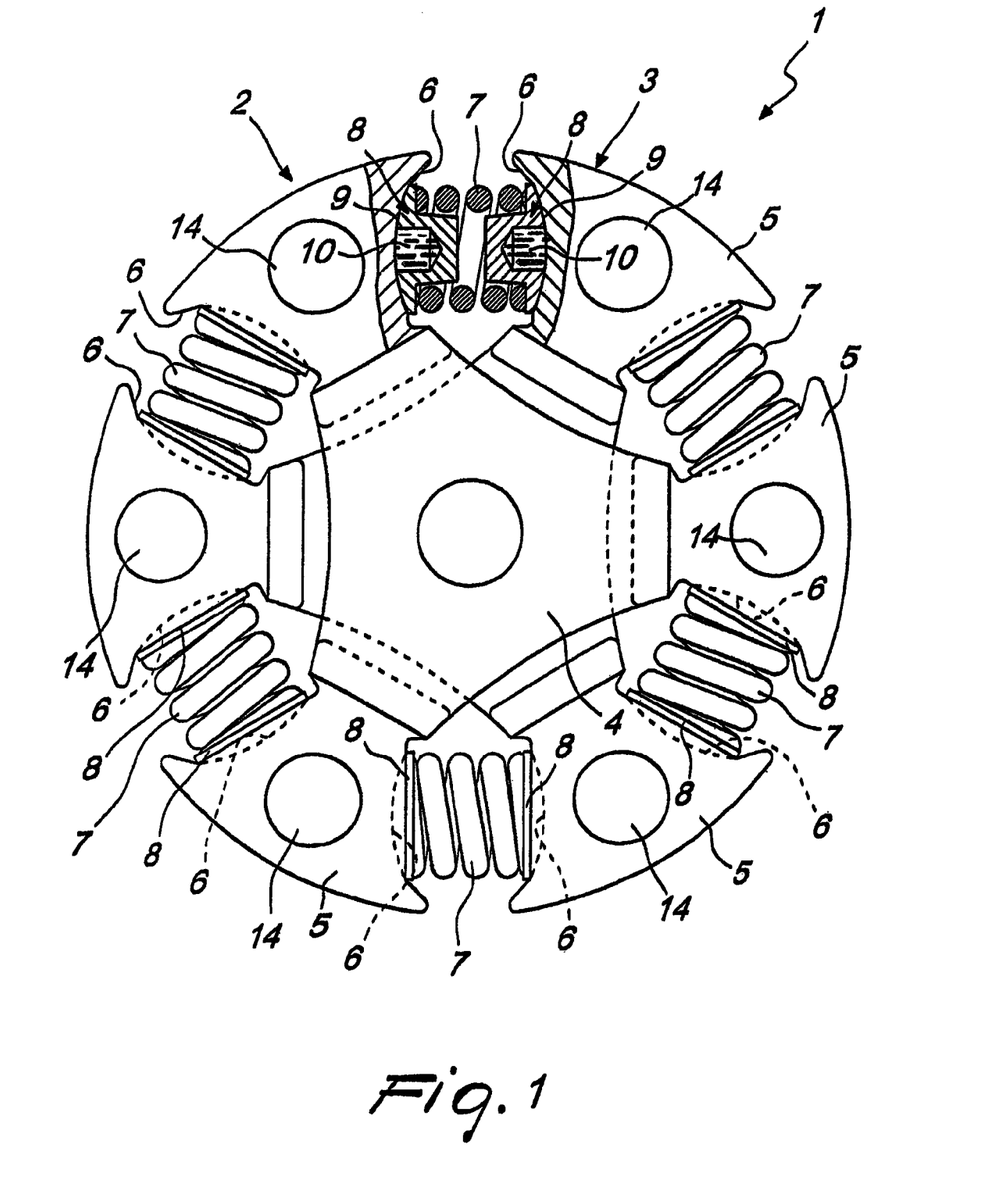
FIG. 1 is a partially sectional front view of an elastic coupling with helical springs with a cast iron body, according to the present invention.
Figures 2, 3:
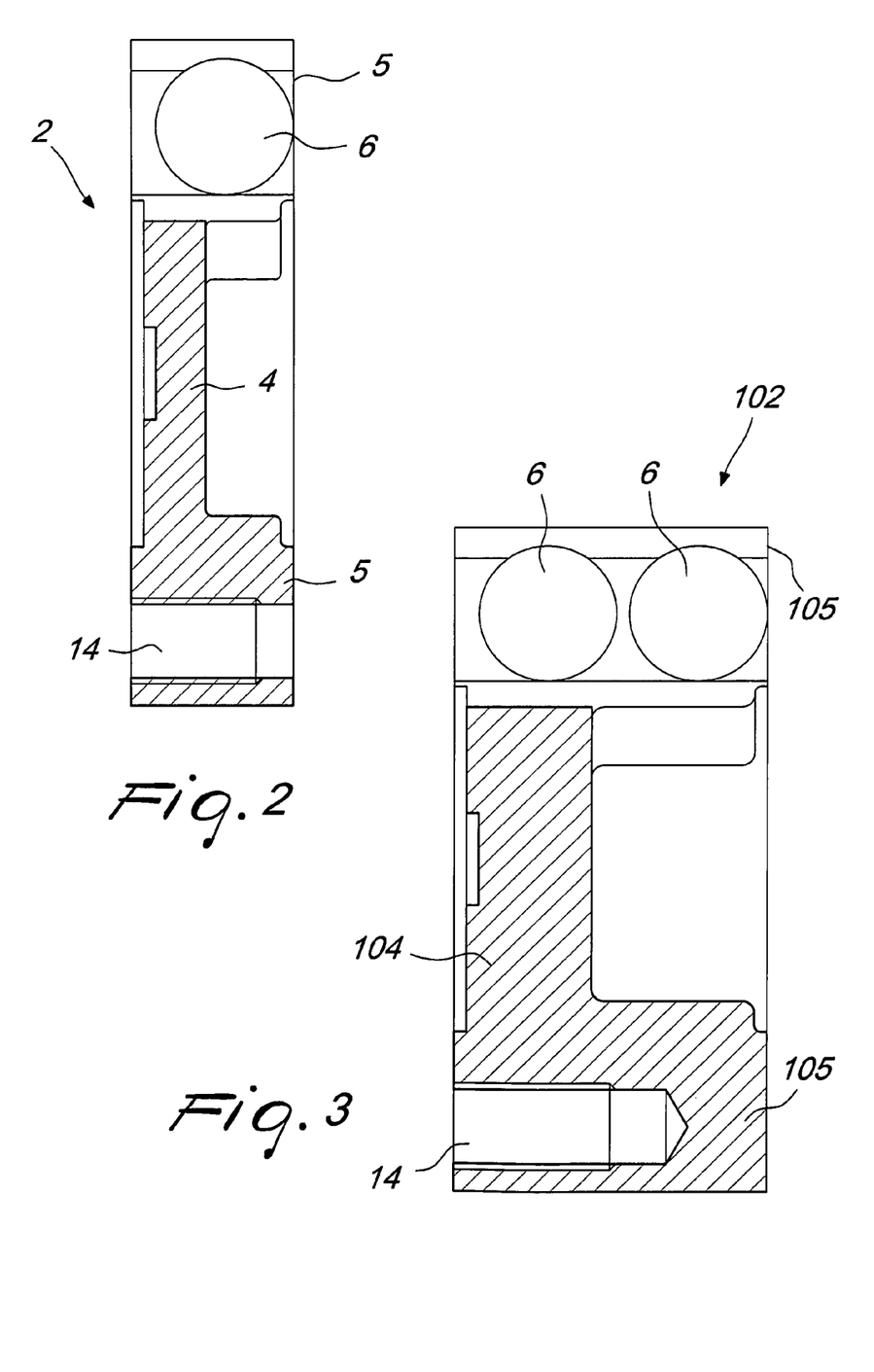
FIG. 2 is a side view of a single body of a coupling according to the present invention.
FIG. 3 is a side view of a double body of a coupling according to the present invention.

The bodies of the coupling can include multiple helical springs 7 arranged side by side, as shown by way of example in FIG. 3, which shows a body 102 constituted by a main portion 104 provided with a plurality of axial protrusions 105.

Each axial protrusion 105 comprises two transverse and laterally adjacent seats 6. Each seat 6 accommodates the end of a helical spring.

The operation of the elastic coupling with helical springs according to the present invention is as follows.

During use, the mutually opposite protrusions 5 tend to move mutually closer, compressing the spring 7 interposed between them, which rests against the spherical base and, with limited friction, moves with respect to the spherical surface of the seat 6, so that the spring does not bend and always works in a rectilinear condition.

The mating spherical surfaces between each spring and its respective seats provide a floating engagement means that recover the misalignment caused by the variation in the distance between the seats. The floating engagement means limit the stresses and allow the spring to work exclusively in an axial direction, without flexing, contrary to conventional spring couplings, wherein the springs are inserted in simple cylindrical seats and must necessarily flex while working.

In practice it has been found that the invention achieves the intended aim and objects.

The elastic coupling with helical springs according to the invention allows the springs to work without flexing and with extremely low friction between the ends of the springs and the seats in which they are inserted.

The cavity 10, with which the spring supporting base 8 is advantageously provided, allows to store lubricant, which keeps the contact surfaces between the base and the seat lubricated, further reducing friction between them.

The elastic coupling according to the invention is susceptible of numerous modifications and variations, within the scope of the inventive concept.

Figure 7:
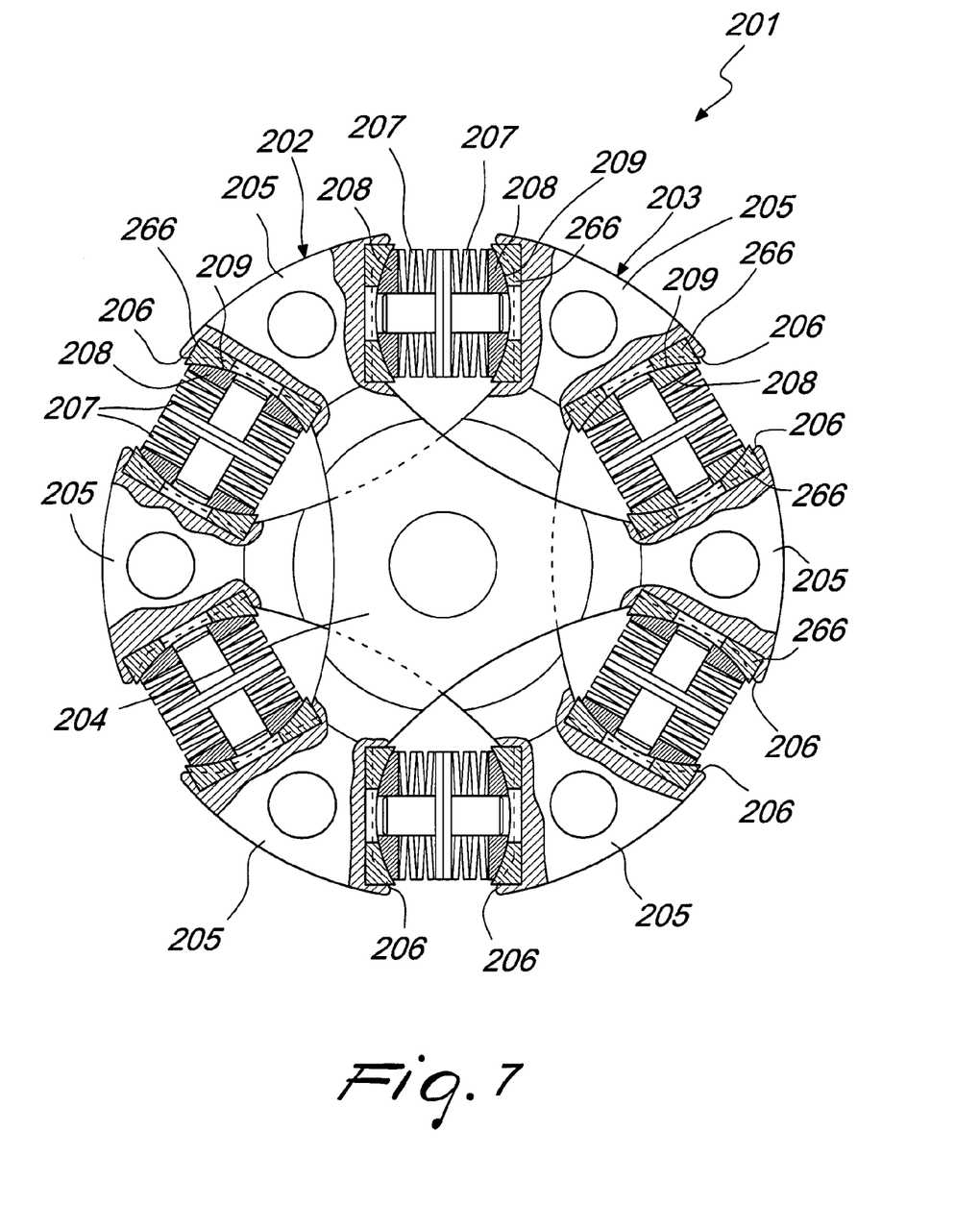
FIG. 7 is a partially sectional front view of an elastic coupling with Belleville springs, according to a further aspect of the invention.

For example, FIG. 7 illustrates a coupling, generally designated by the reference numeral 201, according to a further aspect of the invention, in which the elastic members are constituted by Belleville springs.

The coupling 201 comprises a pair of bodies that are constituted respectively by a first body 202 and by a second body 203.

The bodies 202 and 203 can be identical.

Each body 202, 203 comprises a main portion 204, which is provided with a plurality of axial protrusions 205.

Each axial protrusion 205 has at least one transverse seat 206, which is suitable to accommodate the end of a pack of Belleville springs 207.

According to the present invention, each end of a spring pack is provided with a spherical spring supporting base 208, which includes an engagement surface constituted by a spherical dome 109.

The spherical dome 109 rests against the bottom surface of the transverse seat 106, which is correspondingly spherical.

Preferably, as shown in FIG. 7, a concave disk 266 is embedded in the body of the device and is made of a hard material in order to limit its wear caused by friction against the spring supporting base 208.

Figure 8:
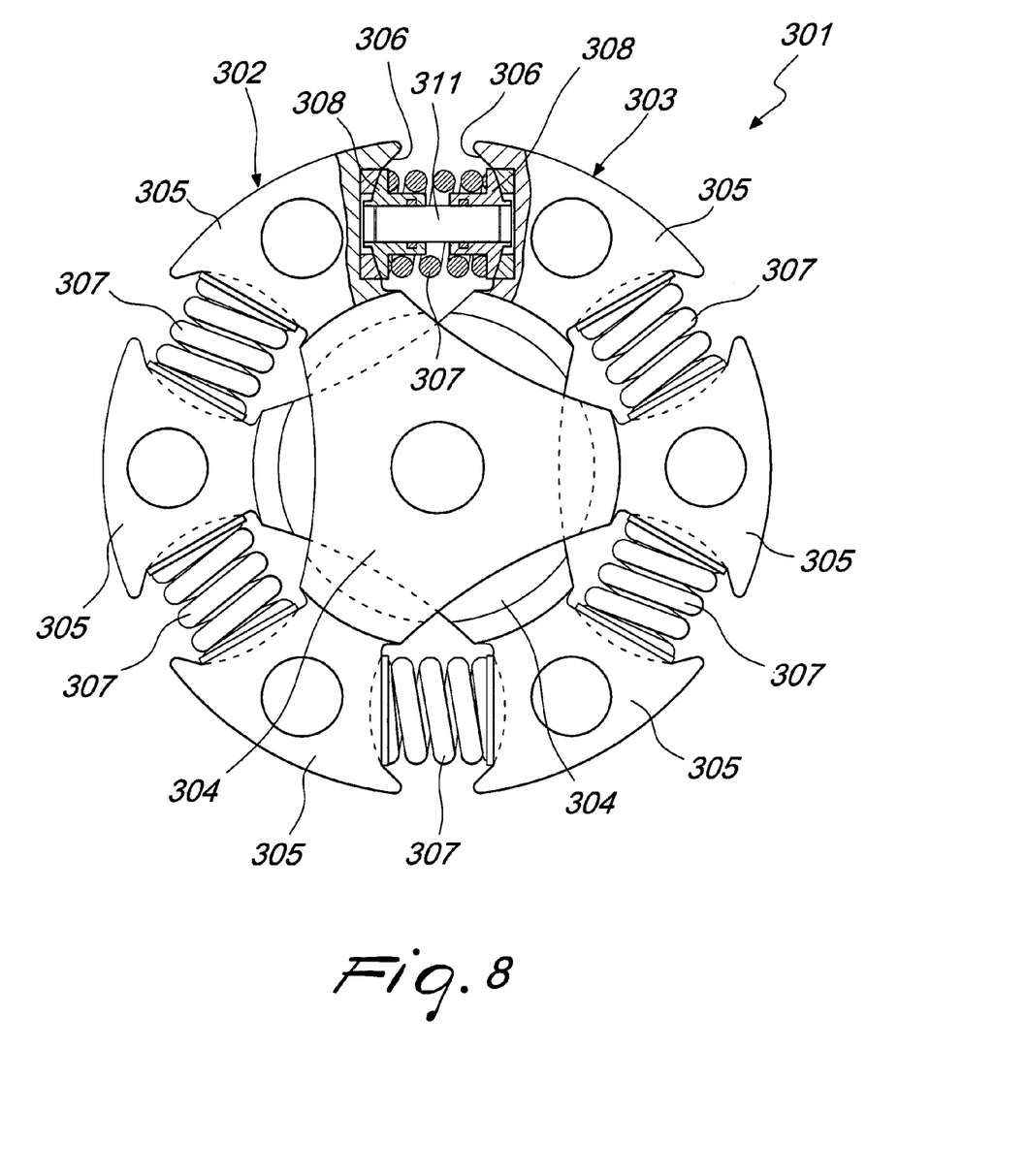
FIG. 8 is a partially sectional front view of an elastic coupling, according to a further aspect of the invention.
Figure 9:
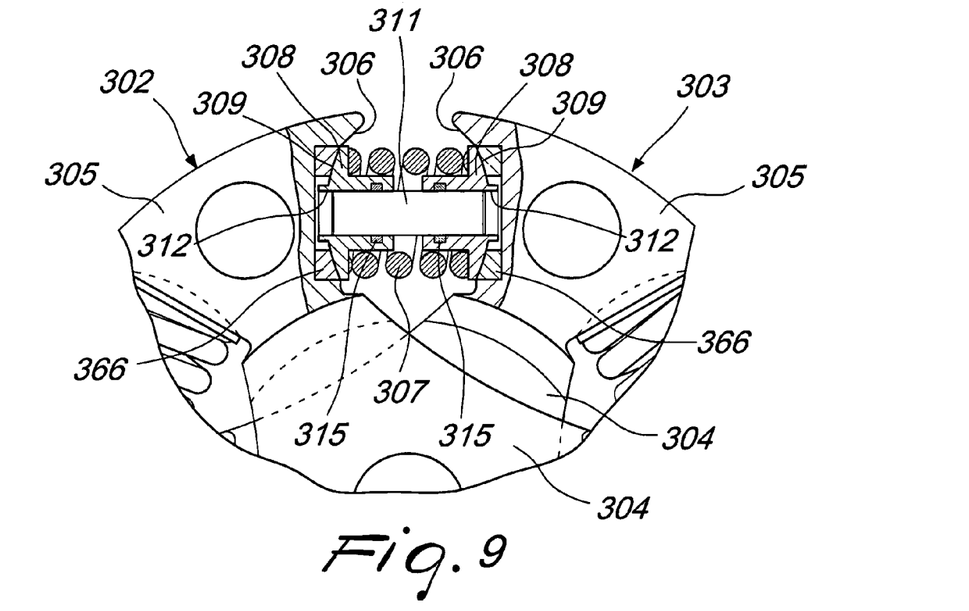
FIG. 9 is a partially sectional enlarged view showing one of the springs of the elastic coupling of the preceding figure.

FIGS. 8 and 9 illustrate a coupling, generally designated by the reference numeral 301, according to a further aspect of the invention, in which the elastic members are constituted helical springs.

The coupling 301 comprises a pair of bodies that are constituted respectively by a first body 302 and by a second body 303.

The bodies 302 and 303 can be identical.

Each body 302, 303 comprises a main portion 304, which is provided with a plurality of axial protrusions 305.

Each axial protrusion 305 has at least one transverse seat 306, which is suitable to accommodate the end of a helical spring 307.

According to the present invention, each end of the spring is provided with a spherical spring supporting base 308, which includes an engagement surface constituted by a spherical dome 309.

The spherical dome 309 rests against the bottom surface of the transverse seat 306, which is correspondingly spherical.

As shown in the figures, the transverse seat 306 has a concave disk 366, which is embedded in the axial protrusion 305 of the body 302, 303.

Figure 10:
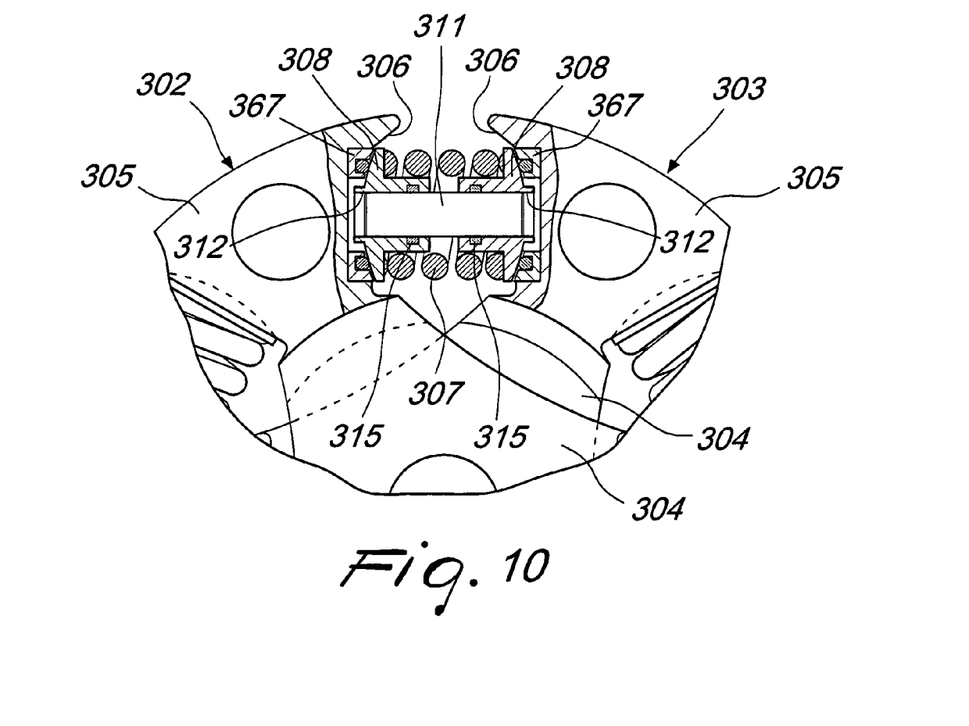
FIG. 10 is a partially sectional enlarged view showing one of the springs of the elastic coupling, according to a further aspect of the invention.
Figure 11:
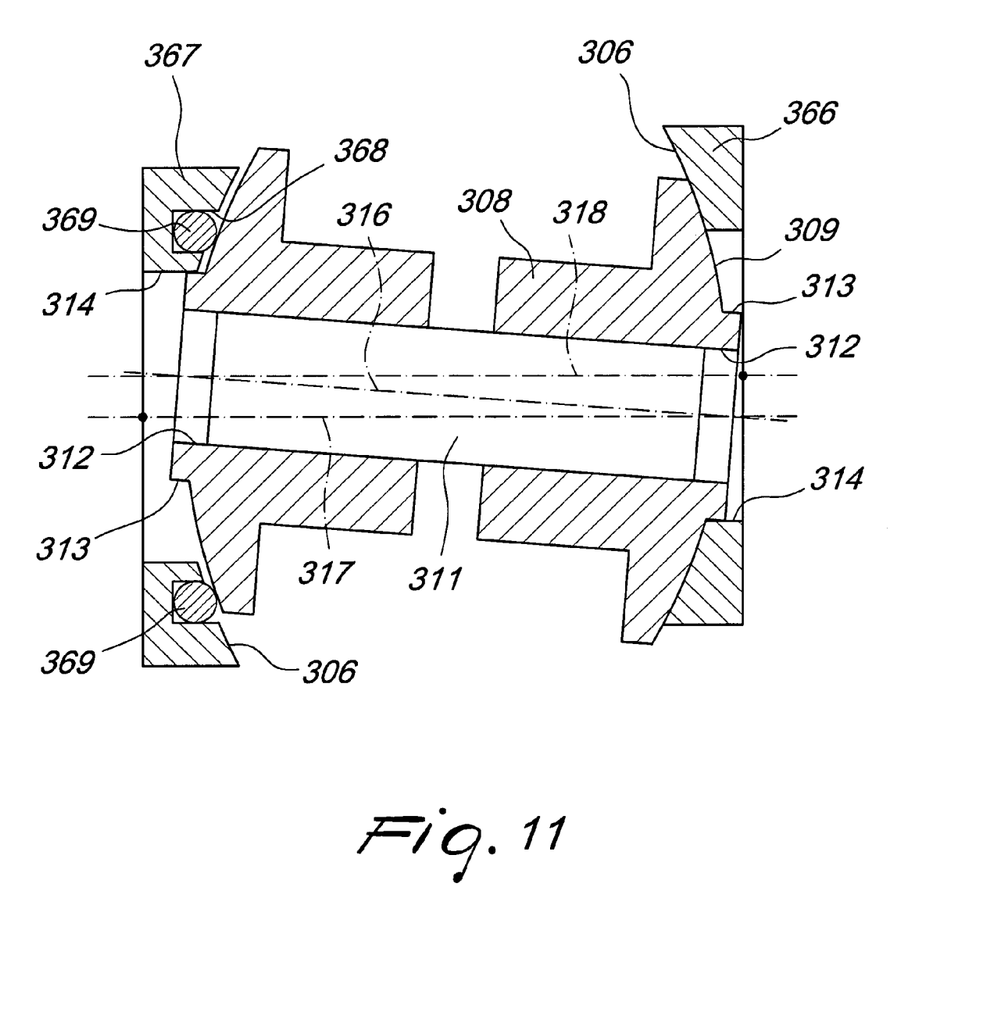
FIG. 11 is a schematic sectional view of a spring assembly of the coupling of the preceding figure.

As shown in FIGS. 10 and 11, the concave disk may be modified to accommodate a set of balls.

In such case, the concave disk, designated by the reference numeral 367 is provided with an annular seat 368 which accommodates a set of balls 369 that provide a rolling bearing between the supporting base 308 and the spherical seat 306.

According to this embodiment of the invention the two supporting bases 308 of each spring 307 are joined by a pivot 311.

Each end of the pivot 311 is inserted in an axial through seat 312 provided in each supporting base 308.

A collar 313 is provided on each supporting base 308, on the side of the spherical dome 309.

The collar 313 is adapted to abut in a seat 314 provided in each concave disk 366 thus limiting the oscillation of the spring assembly constituted by spring 307, supporting bases 308 and pin 311.

A couple of rubber rings 315 may be arranged in respective annular seats formed inside the axial through seats 312 of the supporting bases 308.

Such rubber rings 315 surround the pin 311 and absorb the torsion vibrations of the assembly.

FIG. 11 shows the relative positions of the pin axis 316, and axis 317 and 318 of the transverse seats 306 when the spring assembly is oscillating.

The spring assembly of the embodiment illustrated in FIGS. 8-11, prevents the spring from warping and substantially prevents radial stresses on the spring.

This application claims the priority of Italian Patent Application No. MI2009A000183, filed on Feb. 12, 2009, the subject matter of which is incorporated herein by reference.

The invention claimed is:

1. An elastic coupling comprising a first body and a second body,
   said first body and said second body being able to rotate about a common axis,
   said first body being associated with said second body by means of a plurality of springs,
   each of said springs having a first end associated with said first body and a second end associated with said second body, wherein:

the ends of said springs are associated with respective ones of the bodies by floating engagement means, said first body is identical to said second body;

each of said bodies comprises a main portion provided with a plurality of axial protrusions;

each of said axial protrusions comprises at least one transverse seat, which is suitable to accommodate one of said ends of one of said springs;

each end of said springs is provided with a spring supporting base, said base comprises an engagement surface constituted by a spherical dome, said spherical dome rests against a bottom surface of said transverse seat, said bottom surface of said transverse seat is correspondingly spherical;

said spring supporting base comprises a cavity constituted by a dead hole, said cavity accommodating lubricant;

said dead hole is open onto said spherical dome; and said lubricant is inserted in said cavity during the assembly of the coupling.

2. The coupling according to claim 1, wherein said springs are helical springs.

3. The coupling according to claim 1, wherein said springs are Belleville springs.

4. The coupling according to claim 1, wherein each of said transverse seats comprises a respective concave disk, said concave disk being embedded in the respective one of said bodies.

5. The coupling according to claim 1, wherein each of said transverse seats has a concave disk, which is embedded in the respective one of said axial protrusions of said bodies; and said concave disk is provided with an annular seat which accommodates a set of balls that provide a rolling bearing between said supporting base and said bottom surface of the respective transverse seat.

6. The coupling according to claim 5, wherein said supporting bases of each of said springs are joined by a pivot.

7. The coupling according to claim 6, wherein said pivot has two ends; each end of said pivot is inserted in an axial through seat provided in each supporting base.

8. The coupling according to claim 7, wherein a collar is provided on each said spring supporting base, on the side of the respective spherical dome; and said collar is adapted to abut in a seat provided in each said concave disk, thus limiting the oscillation of the spring assembly constituted by said spring, said supporting bases and a pin.

9. The coupling according to claim 8, further comprising two rubber rings arranged in respective annular seats formed inside said axial through seats of said supporting base, wherein said rubber rings surround said pin and absorb the torsion vibrations of said spring assembly.

10. The coupling according to claim 1, further comprising assembly means, wherein said bodies are connectable to respective members for transmission by said assembly means; said assembly means comprising screws which engage threaded axial seats formed in said protrusions.

11. The coupling according to claim 1, wherein each of said bodies comprises a main portion provided with a plurality of axial protrusions; and each one of said axial protrusions comprises two or more side-by side transverse seats, each one of said side-by-side transverse seats being suitable to accommodate the end of a respective spring.

12. An elastic coupling comprising a first body and a second body, said first body and said second body being able to rotate about a common axis, said first body being associated with said second body by means of a plurality of springs, each of said springs having a first end associated with said first body and a second end associated with said second body, wherein:

said ends are associated with the respective bodies by floating engagement means;

said first body is identical to said second body;

each of said bodies comprises a main portion provided with a plurality of axial protrusions;

each of said axial protrusions comprises at least one transverse seat, which is suitable to accommodate one of said ends of one of said springs;

each end of each of said springs is provided with a spring supporting base;

said base comprises an engagement surface constituted by a spherical dome;

said spherical dome rests against a bottom surface of a respective one of the transverse seats;

said bottom surface is correspondingly spherical; and each of said transverse seats comprises a concave disk, said concave disk being embedded in a respective one of said first body and said second body.

13. An elastic coupling comprising a first body and a second body, said first body and said second body being able to rotate about a common axis, said first body being associated with said second body by means of a plurality of springs, each of said springs having a first end associated with said first body and a second end associated with said second body, wherein:

said ends are associated with the respective bodies by floating engagement means;

said first body is identical to said second body;

each of said bodies comprises a main portion provided with a plurality of axial protrusions;

each of said axial protrusions comprises at least one transverse seat, which is suitable to accommodate one of said ends of one of said springs;

each end of each one of said springs is provided with a spring supporting base;

said base comprises an engagement surface constituted by a spherical dome;

said spherical dome rests against a bottom surface of a respective one of the transverse seats;

said bottom surface is correspondingly spherical;

said transverse seat has a concave disk, which is embedded in said axial protrusion of said body;

said concave disk is provided with an annular seat which accommodates a set of balls that provide a rolling bearing between said supporting base and said spherical seat.

14. The coupling according to claim 13, wherein said supporting bases of each of said springs are joined by a pivot.

15. The coupling according to claim 14, wherein said pivot has two ends; and each end of said pivot is inserted in an axial through seat provided in each supporting base.

16. The coupling according to claim 15, wherein a collar is provided on each said spring supporting base, on the side of the respective spherical dome; and said collar is adapted to abut in a seat provided in each said concave disk, thus limiting the oscillation of the spring assembly constituted said spring, said supporting bases and a pin.

17. The coupling according to claim 16, further comprising two rubber rings arranged in respective annular seats formed inside said axial through seats of said supporting base, wherein said rubber rings surround said pin and absorb the torsion vibrations of said spring assembly.

* * * * *